Patented Jan. 18, 1938

2,105,835

UNITED STATES PATENT OFFICE 2,105,835

STERILIZING LIQUID

Georg Alexander Krause, Munich, Germany, assignor, by mesne assignments, to Katadyn Inc., New York, N. Y., a corporation of Delaware No Drawing. Application December 13, 1933, Serial No. 702,268. In Germany December 13, 1932

17 Claims. (Cl. 99—220)

This invention relates to the sterilization of liquids, especially water, by chemical and oligodynamical agents.

The sterilizing action of hydrogen peroxide and its derivatives is known. In most cases hydrogen peroxide acts somewhat less energetically than chlorines, but it has the advantage that it does not impart any bad taste or odour to the liquid to be sterilized, and that after completion of the sterilization no ingredients are left in the liquid which destroy the material of the conduits and vessels or are harmful to human health.

On the other hand the oligodynamic sterilization of liquids is likewise known whereby certain metals, particularly silver and copper are caused to act on the liquid. This method of sterilizing has the great advantage that the liquid is not impaired in any way; the sterilizing action, however, takes place somewhat slowly and it is, therefore, advisable to interpose between the treatment of liquids by metals and withdrawal thereof for consumption a certain period of time governed by the prevailing circumstances.

It was found that the process of sterilization is accelerated to a surprising degree by combining the two methods of sterilization. Thus, according to the invention, hydrogen peroxide as well as metal are caused to act on the liquid to be sterilized. Instead of hydrogen peroxide also its derivatives and, in general, compounds able to split off oxygen with or without action of catalyzers may be used. To such compounds belong superoxides, per-salts such as persulphate, perphosphate, percarbonate, and furthermore, addition compounds of hydrogen peroxide with normal salts or with indifferent organic substances. As to metals, such as are oligodynamically active, particularly silver and copper, and also a whole series of other metals are suitable the oligodynamic action of which is but small in itself, for instance precious metals such as platinum, iridium, gold; further the metals of the iron group, i. e. iron, cobalt, nickel, and many others. A double role is assigned to the metals according to the method of the present invention; in the first place, they possess a sterilizing action themselves by poisoning the bacteria, and in the second place they are indirectly active by decomposing catalytical hydrogen peroxide or the chemical bodies charged with oxygen and thereby accelerate the germicidal action of the hydrogen peroxide.

The metals may be used in their elementary form and also in form of their oxides or of difficultly soluble salts; thus solid silver oxide e. g. has a very energetic oligodynamic and at the same time catalytic effect. Finally, the metals may also be caused to act in the form of their easily soluble salts.

For treating liquids containing germs by metals of sterilizing activity greatly divergent methods are at the command of the art, some of which are in part generally known, while others are disclosed in my previous applications and patents. A brief summary may be rendered in the following:

The solid metals or their difficultly soluble compounds may be brought into direct contact with the liquids (contact-method), a large contact surface being conveniently created between the active substance and the liquid. The liquid may also be saturated with a difficultly soluble compound of the active metal, or a more easily soluble compound of the metal may be added to it, whereby the concentration of the metallic salt may be regulated at will in the liquid according to requirements. The active metal may also be transferred into the liquid by electrical means, e. g., by inserting the active metal in the form of an anode into the treatment circuit. Still further methods of causing metals to act on liquids may be utilized: the metal may be atomized electrically in the liquid, colloidal solutions or very fine suspensions of the metal or the metal compound may be produced in the liquid by chemical or physical methods, etc..

Hydrogen peroxide, per-salts and other compounds charged with oxygen may likewise be caused to act on the liquid in various ways. E. g., a certain quantity of a strong, say 30 or 60% hydrogen peroxide solution may be mixed with the liquid; or added to it may be per-borate that has been produced from borax and hydrogen peroxide for instance, and that gives off hydrogen peroxide when coming into contact with water; or potassium persulphate produced by electrolysis of a potassium bisulphate solution under certain conditions may be added to the liquid, etc.; calcium superoxide and a corresponding quantity of sulphuric acid may be added to it, and so forth.

It is well understood that the invention is not limited to the application of any of the methods mentioned by which a liquid may be treated, be it with metals or their compounds, be it with hydrogen peroxide and other substances carrying oxygen; on the contrary, all methods that can be carried into practice and according to which the liquid may be treated with either of the two classes of substances, may likewise serve to carry out the combined method according to the present invention.

The combined action of the two classes of substances may take place according to the invention in many varied ways. The action may take place simultaneously and/or successively. A great number of embodiments will result from the possibility of combining any method of treating liquid by representatives of the one class of substances with any method of treating the liquid by representatives of the other class of substances. A few of these embodiments may be cited by way of example:

1. For instance the liquid may be first caused to flow through a container or to stay in a container filled with bodies of ceramic material, e. g. Raschig rings coated with silver of large surface. After a certain time of contact the liquid is drawn off from this container and a solution of hydrogen peroxide is added. The sterility then occurs considerably faster than if the liquid had only been treated according to one of the two methods.

2. The method of treatment described under 1 may be reversed by first adding hydrogen peroxide to the liquid and then conducting it through the container furnished with active metals or metal compounds.

3. Determined quantities of a soluble metal compound and determined quantities of hydrogen peroxide or soluble persalt or the like may be dissolved in the liquid simultaneously or successively.

4. A colloidal distribution or fine suspension of active metal, metallic oxide, or metallic salt may be produced in the liquid, and thereupon hydrogen peroxide, per-salt or the like is added. If the liquid contains chlorides, a fine distribution of chloride of silver may be produced for instance, by cautiously adding silver nitrate and admixing, if necessary some protecting colloid, until a fine turbidity or opalescence manifests itself. If there are no chlorides present in the liquid, chlorides may be added in the form of common salt solution or hydrochloric acid. Such fine turbidities or colloidal solutions of chloride of silver and similar metallic compounds have a particularly strong action both as regards direct sterilization and as regards catalytic decomposition of the hydrogen peroxide or other carriers of oxygen.

5. Hydrogen peroxide or some other soluble substances charged with oxygen may be added to the liquid, and the latter is then caused to flow through a vessel in which it is exposed to a weak direct electric current between silver electrodes. By adjusting the speed of flow of the liquid and the strength of the electric current the quantity of silver absorbed may be accurately regulated.

In many cases it is advantageous to cause one of the two classes of active substances or both of them to act in dosed form. The compounds of active metals may, for instance, be supplied in the form of individual packages each of which is suitable for the sterilization of a determined quantity of liquid, the quantity of the active substance or the quantity of liquid which can be sterilized thereby, being stamped on the packages or being indicated on the wrappers. Thus, for large quantities of liquid, handy packages of ½ or 1 kilogram may be used with exactly measured contents of active metal, and for small quantities of liquid may be provided small packages, such as tablets and the like with the indication of contents marked thereon. In a like manner the other class of active substances, viz., hydrogen peroxide in form of its solid compounds may be supplied in dosed individual quantities.

The active substances may also be enclosed in soluble wrappings which gradually dissolve or break up in the liquid in order to liberate the active substances gradually by degrees. E. g. gelatine capsules and the like, such as are known for administering medicines may be employed. If one of the two classes of active substances or both are enclosed in such wrappings and added to the liquid, the catalytic process, that is, the decomposing action of the one substance on the other may be retarded at will. This may be of importance, for instance, in the case of strong catalyzers, where a direct immediate contact between the catalyzer and the carrier of oxygen leads to a sudden violent evolution of oxygen, when under certain circumstances a large part of the oxygen evolved escapes unused from the liquid.

Instead of a wrapping of some gelatine material the active substances may also be covered with a crust of crystals of a suitable neutral substance which dissolves gradually in the liquid and liberates the active substance.

It is also possible to join the active substances prior to their introduction into the liquid, i. e., to mix them previously. Dry per-salts and the like, and dry catalyzers may be intimately mixed without any decomposition taking place. Thus a mixed power may be prepared containing both substances, e. g. a mixture of calcium peroxide with silver chloride, so as to supply this mixture, if required, in the form of individual portions, and to enclose them in suitable wrappings which protect the sterilizing agents before their use against coming into contact with moisture. After incorporating this agent into the liquid to be sterilized, the covering dissolves, and the two intimately mixed substances can enter into mutual reaction.

The simultaneous action of substances yielding oxygen on the one hand and of active metals or metallic compounds on the other hand according to the invention, has not only the advantage of intensifying the sterilizing action, but also the further advantage that the liquid once sterilized remains sterile. Naturally hydrogen peroxide and other sterilizing agents yielding oxygen can develop their sterilizing action but once; once the nascent oxygen is consumed, the sterilizing action is exhausted. It is a different matter, when metals or metallic compounds are present in the liquid at the same time, or when they are in contact with it. These metals retain their sterilizing action for an almost unlimited length of time, and, therefore, protect the liquid that has once become free of germs, against new infection, even if it is stored for any length of time, before being used.

Some of the liquids that may be advantageously subjected to the treatment according to the present invention are, for example: water, mineral waters, lemonade, syrups, must, beer, milk, vegetable extracts, liquid medicines. Furthermore the liquids sterilized according to the invention e. g. sterilized water, may be employed to advantage for preserving decomposable goods, such as eggs, fruit, meat, vegetables, tobacco, medical instruments, implements and machines for the manufacture of food stuffs and table-luxuries, disinfection of cotton wool, wound dressing requisites, wool, upholstering material, linen, and the like; they also represent a hygienic flushing liquid of great disinfecting power, but very little aggressiveness towards the textures of the human body. These examples pointing to the application might be increased by numerous others.

A field of application of a particular kind is opened for the method according to the invention in the manufacture of ice for preserving food products and similar perishable substances. It is important that the ice should not only retard the development of germs at low temperatures, but that the water resulting from the melting ice should also act positively germicidal. It has indeed already been proposed to add hydrogen peroxide to ice. This has the advantage that, after the sterilizing action has taken place, no decomposition products alien to the human body are left on the matter; besides, the agent is tasteless and odourless and effectively prevents the occurrence of the odour of decomposition of the food stuff, e. g. the smell of fish. But there is a disadvantage connected with hydrogen peroxide and its compounds at low temperatures it yields its oxygen to oxidable bodies but slowly, and the sterilizing action is exhausted with the complete separation in water and oxygen, that is to say, it is not durable.

I have found that the other class of sterilizing agents, that is, the metals and metallic compounds of sterilizing activity may be employed very advantageously as an addition to ice. Being used in but infinitesimal quantities, they do not leave in or on the food products any residues harmful to the human body. They act indeed slowly, but in comparison with the hydrogen peroxide they have the advantage of rendering the water resulting from the melting ice permanently bactericidal, so that any posterior seed of bacteria is also destroyed.

However, I have discovered that a specially good protection of the perishable goods is afforded by the joint use of agents of both classes of agents as an addition to ice. The second class, that is the oligodynamic metals act at the same time as catalyzers for hydrogen peroxide, and accelerate its evolution of oxygen to oxidable bodies with the temperature of the melting ice. Thus both agents supplement each other in a fortunate manner. The hydrogen peroxide destroys quickly the main quantity of the germs living on the corresponding matter; and after the decomposition of the hydrogen peroxide, the metals develop their slow, but durable sterilizing activity and prevent new infections from taking place.

According to the invention the water from which ice is to be manufactured, may be charged on the one hand with hydrogen peroxide and other carriers of oxygen, on the other hand with metal of sterilizing or catalytic effect, and both kinds of ice, in case of need, may be broken up and mixed with one another. During the melting, parts of the water charged with oxygen come into contact with parts of the water charged with metal, and the joint action can develop. But according to the present invention both substances may also be enclosed, so to speak, in the ice-covering simultaneously, by using for the manufacture of the ice water which initially possesses carriers of oxygen as well as metals. Upon melting, a liquid is immediately produced that contains both chemical agents absolutely evenly distributed, and this effects a very energetic and speedy sterilization. It will be very favourable in this connection, if the metal or metallic salt in the ice is present in the form of a colloidal division or a fine suspension, since an energetic catalytic action emanates particularly from colloidal metal, and on the other hand, a strong delivery of ions takes place which on their part attack the bacteria effectively.

It is advantageous to use for freezing not distilled water, but water which possesses a certain content of salts, this content being adjusted in such a manner that the osmotic pressure of the melting water is approximately in equilibrium with the osmotic pressure of the cell liquid of the respective perishable matter, e. g., an animal body such as fish. With fish one may assume that the osmotic pressure of their cell liquid is in equilibrium with the water from which they originate. For instance, with fish from the Mediterranean a salt solution of approximately 5° Bé., with fish from the Atlantic one of 3½–4° Bé., with fish from the Baltic a correspondingly lower content of salt will be chosen, and in case of need, also the genuine sea or fresh water from which the fish originated may be used for freezing. When the ice melts on the surface of the preserved fish, the cell walls of the latter are not subjected to over-pressure or under-pressure and it therefore preserves its natural appearance for a longer time than with ice of different osmotic pressure. The disinfecting agents mentioned above, viz. peroxides and the like on the one hand, and oligodynamic metals on the other hand are then added to the saliniferous freezing water according to the invention.

The method according to the invention is naturally not confined to block-ice, but it is applicable to any commercial ice, thus e. g. to sheet-ice, fragment-ice, packed ice, snow etc.

What I claim is:

1. The method of sterilizing liquids, consisting in adding to a liquid determined quantities of carriers of oxygen such as hydrogen peroxide, and then exposing said liquid to the action of oligodynamically active metal which acts catalytically upon said hydrogen peroxide.

2. In a method for sterilizing a liquid, the steps comprising adding to said liquid an oxygen evolving agent such as hydrogen peroxide, and then moving said liquid through a receptacle containing electrodes connected to a weak electric current, the anode consisting of an oligodynamically active substance which acts catalytically upon said hydrogen peroxide.

3. The method of sterilizing liquids, comprising, adding to a liquid an oligodynamically active substance, and then exposing said liquid to the action of a difficultly soluble oxygen evolving substance, said oligodynamically active substance acting catalytically thereon.

4. A method for sterilizing liquids, comprising, adding to said liquid a combined product consisting of carriers of oxygen such as hydrogen peroxide and an agent consisting of oligodynamically active substance, at least one of said agents being contained in an envelope adapted to dissolve in said liquid upon the use thereof so as to liberate said agent therein and to effect its catalytic co-action with said other agent.

5. A process for sterilizing liquids comprising, subjecting said liquid to the combined action of an oligodynamically active agent such as silver oxide and an oxygen evolving agent such as hydrogen peroxide.

6. The process of sterilizing liquids comprising, subjecting said liquid to the action of an oligodynamically active agent such as silver chloride and to the action of an oxygen evolving agent such as hydrogen peroxide.

7. In the manufacture of commercial sterilized ice, the steps comprising, subjecting water prior to freezing to the action of an oligodynamically active agent such as silver and to the action of an oxygen evolving substance such as hydrogen peroxide, and freezing the water thus treated to form said ice, said agents being liberated upon melting of said ice and said oligodynamically active agent acting upon said oxygen evolving agent initially as a catalyst and subsequently acting independently as a sterilizing agent for the liquid resulting from said melting ice.

8. The method of sterilizing liquids which consists in causing carriers of oxygen, such as hydrogen peroxide, together with metals of a sterilizing and catalytic action to act on the liquid.

9. The method as defined in claim 8, wherein said carriers of oxygen and said metals are caused to act on said liquid simultaneously.

10. The method defined in claim 8, wherein said carriers of oxygen and said metals are caused to act on said liquid successively.

11. The method of manufacturing ice with sterilizing properties consisting in adding both a metallic substance of sterilizing and catalytic action and an oxygen evolving substance, such as hydrogen peroxide, to the water prior to freezing so as to be present in the ice as such.

12. Ice for preserving perishable goods, characterized by containing small quantities of an oxygen yielding substance such as hydrogen peroxide and an oligodynamically active agent which acts catalytically upon said oxygen yielding substance.

13. Ice for preserving decomposable edible matter having a certain osmotic pressure, characterized by containing small amounts of metallic substances having sterilizing and catalytic action together with oxygen evolving substances such as hydrogen peroxide, and by its melting water possessing an osmotic pressure which is substantially in equilibrium with the osmotic pressure of the cells of the edible matter to be preserved.

14. The process of sterilizing liquids which comprises adding to said liquid an envelope which is soluble therein and contains a carrier of oxygen together with an oligodynamically active substance which acts catalytically upon said carrier of oxygen.

15. In the manufacture of commercial ice having sterilizing properties, the steps of treating a quantity of water with an oligodynamically active catalytic agent and freezing it, adding an oxygen-evolving substance, such as hydrogen peroxide, to another quantity of water, freezing said other quantity of water before said substance has entirely decomposed, and mixing the ice resulting from the freezing of both said treated quantities of water, a catalytic coaction being set up between said agent and said substance upon melting of said ice whereby the sterilizing properties thereof are accelerated.

16. In the art of sterilizing liquids, a container for receiving the liquid to be sterilized, an insoluble carrier positioned within said container, and a sterilizing agent disposed in said carrier for acting upon said liquid, said sterilizing agent comprising an oxygen-evolving substance such as hydrogen peroxide and an oligodynamically active material which acts catalytically upon said oxygen-evolving substance.

17. An article for sterilizing a predetermined quantity of liquid consisting of an envelope, and a sterilizing agent contained in said envelope consisting of a mixture of a determined quantity of an oligodynamic material such as silver and a determined quantity of an oxygen-evolving substance which is acted upon catalytically by said material upon introducing said envelope into said quantity of liquid to be sterilized.

GEORG ALEXANDER KRAUSE.